US010691324B2

(12) United States Patent
Van Der Westhuizen et al.

(10) Patent No.: US 10,691,324 B2
(45) Date of Patent: Jun. 23, 2020

(54) DYNAMICALLY POPULATING A DISPLAY AND ENTERING A SELECTION INTERACTION MODE BASED ON MOVEMENT OF A POINTER ALONG A NAVIGATION PATH

(71) Applicant: Flow Labs, Inc., Menlo Park, CA (US)

(72) Inventors: Willem Morkel Van Der Westhuizen, Stellenbosch (ZA); Filippus Lourens Andries Du Plessis, Stellenbosch (ZA)

(73) Assignee: Flow Labs, Inc., Menlo Park, CA (US)

( * ) Notice: Subject to any disclaimer, the term of this patent is extended or adjusted under 35 U.S.C. 154(b) by 164 days.

(21) Appl. No.: 15/313,098

(22) PCT Filed: Jun. 3, 2015

(86) PCT No.: PCT/IB2015/054188
§ 371 (c)(1),
(2) Date: Nov. 21, 2016

(87) PCT Pub. No.: WO2015/186069
PCT Pub. Date: Dec. 10, 2015

(65) Prior Publication Data
US 2017/0108998 A1    Apr. 20, 2017

(30) Foreign Application Priority Data

Jun. 3, 2014   (ZA) .................................. 2014/04024

(51) Int. Cl.
*G06F 3/0482*   (2013.01)
*G06F 3/0481*   (2013.01)
(Continued)

(52) U.S. Cl.
CPC .......... *G06F 3/0485* (2013.01); *G06F 3/0482* (2013.01); *G06F 3/0488* (2013.01);
(Continued)

(58) Field of Classification Search
CPC .. G06F 3/0482; G06F 3/04815; G06F 3/0488; G06F 3/0485
See application file for complete search history.

(56) References Cited

U.S. PATENT DOCUMENTS 5,305,435 A * 4/1994 Bronson ............... G06F 3/0481
715/775
5,999,903 A * 12/1999 Dionne ............... G06F 3/04842
704/271

(Continued)

FOREIGN PATENT DOCUMENTS

WO    WO-2013018099 A2 *  2/2013 ............. G06F 3/167

OTHER PUBLICATIONS

Patent Cooperation Treaty, International Search Report, International Patent Application No. PCT/IB2015/054188, dated Oct. 6, 2015, 2 Pages.

(Continued)

*Primary Examiner* — Justin R. Blaufeld
(74) *Attorney, Agent, or Firm* — Fenwick & West LLP

(57) ABSTRACT

An electronic device and a method of display and interaction in a user interface is provided. The method includes: providing a display region and control region of a user interface; initiating the display of a number of interactive items in the display region; upon receiving a predefined interaction from a pointer, tracking the position or movement of the pointer and dynamically populating the display region with a subset of interactive items based on the position or movement of the pointer. In response to detecting a substantial change of direction of the pointer or in response to the pointer crossing a selection threshold, a selection interaction mode is entered in which a user can individually interact with the interactive items populating the display region.

18 Claims, 10 Drawing Sheets

(51) Int. Cl.
*G06F 3/0488* (2013.01)
*G06F 3/0485* (2013.01)

(52) U.S. Cl.
CPC .............. *G06F 3/04815* (2013.01); *G06F 2203/04803* (2013.01); *G06F 2203/04806* (2013.01)

(56) References Cited

U.S. PATENT DOCUMENTS

| | | | | |
|---|---|---|---|---|
| 8,291,349 | B1* | 10/2012 | Park | G06F 3/04883 715/705 |
| 8,379,058 | B2* | 2/2013 | Kraut | G06T 9/001 345/582 |
| 8,477,109 | B1* | 7/2013 | Freed | G06F 3/041 345/173 |
| 9,030,419 | B1* | 5/2015 | Freed | G06F 3/0416 345/173 |
| 9,213,705 | B1* | 12/2015 | Story, Jr. | G06F 16/4393 |
| 9,268,733 | B1* | 2/2016 | Rachabathuni | G06F 15/0291 |
| 9,405,435 | B2* | 8/2016 | Hendricks | G06F 3/0486 |
| 9,817,570 | B2* | 11/2017 | Bostick | G06F 3/04886 |
| 2002/0178007 | A1* | 11/2002 | Slotznick | G09B 5/06 704/270.1 |
| 2003/0142136 | A1* | 7/2003 | Carter | G06F 3/04815 715/782 |
| 2006/0026521 | A1* | 2/2006 | Hotelling | G06F 3/0418 715/702 |
| 2006/0026535 | A1* | 2/2006 | Hotelling | G06F 3/0418 715/863 |
| 2006/0161861 | A1* | 7/2006 | Holecek | G06F 16/904 715/782 |
| 2007/0050251 | A1* | 3/2007 | Jain | G06Q 30/02 705/14.52 |
| 2007/0222768 | A1* | 9/2007 | Geurts | G06F 3/0481 345/173 |
| 2008/0148164 | A1* | 6/2008 | Read | G06F 3/0481 715/763 |
| 2009/0109182 | A1* | 4/2009 | Fyke | G09G 5/26 345/173 |
| 2009/0150775 | A1* | 6/2009 | Miyazaki | G06F 3/041 715/702 |
| 2009/0150784 | A1* | 6/2009 | Denney | G11B 27/034 715/722 |
| 2009/0220206 | A1* | 9/2009 | Kisliakov | G11B 27/034 386/353 |
| 2009/0237367 | A1* | 9/2009 | Ryu | G06F 3/0483 345/173 |
| 2009/0249247 | A1* | 10/2009 | Tseng | H04M 1/72552 715/808 |
| 2009/0265670 | A1* | 10/2009 | Kim | G06F 3/04883 715/863 |
| 2009/0313584 | A1* | 12/2009 | Kerr | G06F 3/012 715/849 |
| 2010/0095240 | A1* | 4/2010 | Shiplacoff | G06F 3/0484 715/784 |
| 2010/0107099 | A1* | 4/2010 | Frazier | G06F 3/044 715/765 |
| 2010/0169836 | A1* | 7/2010 | Stallings | G06F 3/04817 715/848 |
| 2010/0198402 | A1* | 8/2010 | Greer | B25J 9/1666 700/247 |
| 2010/0211872 | A1* | 8/2010 | Rolston | G06F 3/0482 715/702 |
| 2010/0274479 | A1* | 10/2010 | Sheha | G01C 21/36 340/995.13 |
| 2010/0281381 | A1* | 11/2010 | Meaney | G11B 27/34 715/723 |
| 2011/0054837 | A1* | 3/2011 | Ikeda | G06F 3/0414 702/155 |
| 2011/0102421 | A1* | 5/2011 | Minamino | G06F 3/04815 345/419 |
| 2011/0119588 | A1* | 5/2011 | Siracusano, Jr. | G06F 3/0481 715/723 |
| 2011/0179368 | A1* | 7/2011 | King | G06F 3/04815 715/769 |
| 2011/0285665 | A1* | 11/2011 | Matsumoto | G06F 3/044 345/174 |
| 2011/0296351 | A1* | 12/2011 | Ewing, Jr. | G06F 3/0346 715/841 |
| 2011/0320969 | A1* | 12/2011 | Hwang | G06F 1/1626 715/765 |
| 2012/0013613 | A1* | 1/2012 | Vesely | G06F 3/011 345/419 |
| 2012/0052917 | A1* | 3/2012 | Kim | G06F 3/04842 455/566 |
| 2012/0054688 | A1* | 3/2012 | Ohki | G06F 3/04883 715/838 |
| 2012/0056830 | A1* | 3/2012 | Suzuki | G06F 1/1626 345/173 |
| 2012/0162204 | A1* | 6/2012 | Vesely | H04N 13/366 345/419 |
| 2012/0188285 | A1* | 7/2012 | Friedlander | G06F 1/3203 345/660 |
| 2012/0210203 | A1* | 8/2012 | Kandekar | G06F 15/0291 715/230 |
| 2012/0213495 | A1* | 8/2012 | Hafeneger | G11B 27/034 386/282 |
| 2012/0256967 | A1* | 10/2012 | Baldwin | G06F 3/013 345/684 |
| 2013/0047115 | A1* | 2/2013 | Migos | G06F 3/048 715/776 |
| 2013/0063339 | A1* | 3/2013 | Maier | G06F 3/0346 345/156 |
| 2013/0063389 | A1* | 3/2013 | Moore | G06F 3/04883 345/174 |
| 2013/0091462 | A1* | 4/2013 | Gray | G06F 3/0346 715/810 |
| 2013/0246967 | A1* | 9/2013 | Wheeler | G06F 3/012 715/784 |
| 2013/0265222 | A1* | 10/2013 | Berenson | G06F 3/0482 345/156 |
| 2013/0311938 | A1* | 11/2013 | Frazier | G06F 3/044 715/781 |
| 2013/0318477 | A1* | 11/2013 | Lee | G06F 3/0481 715/841 |
| 2013/0326364 | A1* | 12/2013 | Latta | G06F 3/012 715/751 |
| 2013/0326421 | A1 | 12/2013 | Jo | |
| 2014/0049483 | A1* | 2/2014 | Kim | G06F 3/04812 345/173 |
| 2014/0059496 | A1* | 2/2014 | White | G06F 3/0488 715/841 |
| 2014/0082557 | A1* | 3/2014 | Warner | G06F 3/0482 715/834 |
| 2014/0098085 | A1* | 4/2014 | Lee | G06F 3/0487 345/419 |
| 2014/0152541 | A1* | 6/2014 | Murarka | G06F 3/0488 345/156 |
| 2014/0210828 | A1* | 7/2014 | Fleizach | G06F 3/04886 345/467 |
| 2014/0229860 | A1* | 8/2014 | Rogers | G06Q 10/06311 715/753 |
| 2014/0325455 | A1* | 10/2014 | Tobin | G06F 3/04815 715/850 |
| 2014/0337730 | A1* | 11/2014 | King | G06F 16/44 715/716 |
| 2015/0062052 | A1* | 3/2015 | Bernstein | G06F 3/0483 345/173 |
| 2015/0067507 | A1* | 3/2015 | Bohrer | G06F 16/638 715/716 |
| 2015/0067560 | A1* | 3/2015 | Cieplinski | G06F 3/04842 715/765 |
| 2015/0067596 | A1* | 3/2015 | Brown | G06F 3/0416 715/808 |
| 2015/0121291 | A1* | 4/2015 | Scott | G06F 3/0236 715/780 |

(56) References Cited

U.S. PATENT DOCUMENTS

| | | | | |
|---|---|---|---|---|
| 2015/0135140 A1* | 5/2015 | Kobayashi | ............ | G06F 3/0485 |
| | | | | 715/830 |
| 2015/0234567 A1* | 8/2015 | Wakatsuki | .............. | G06F 3/017 |
| | | | | 715/852 |
| 2015/0363070 A1* | 12/2015 | Katz | ........................ | G06F 3/017 |
| | | | | 715/852 |
| 2016/0124707 A1* | 5/2016 | Ermilov | ............... | G08G 1/0968 |
| | | | | 345/156 |
| 2017/0228138 A1* | 8/2017 | Paluka | .................... | G06F 3/017 |

OTHER PUBLICATIONS

Patent Cooperation Treaty, Written Opinion of the International Searching Authority, International Patent Application No. PCT/IB2015/054188, dated Oct. 6, 2015, 5 Pages.

\* cited by examiner

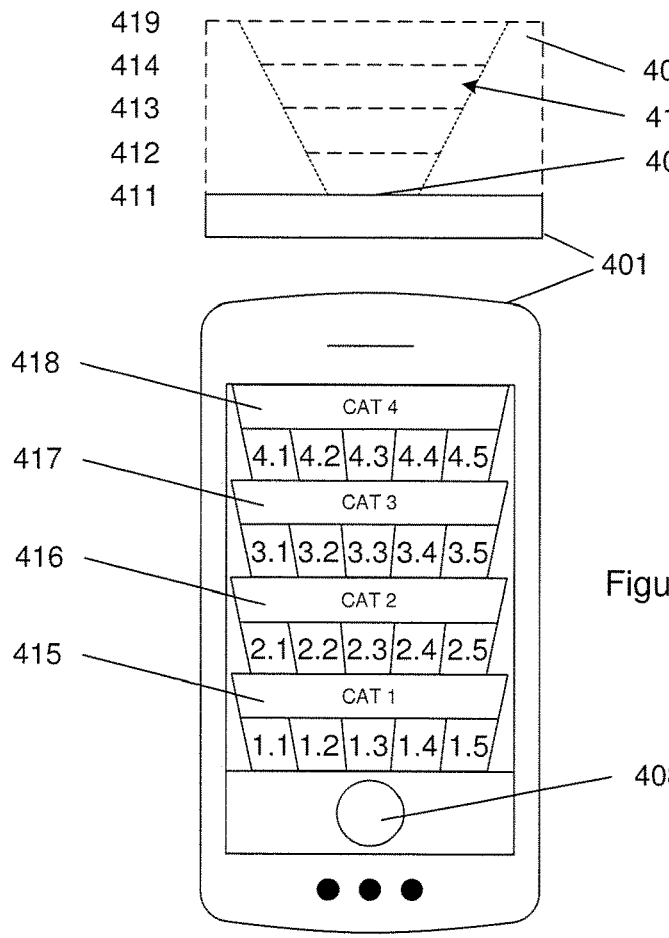
Figure 4A
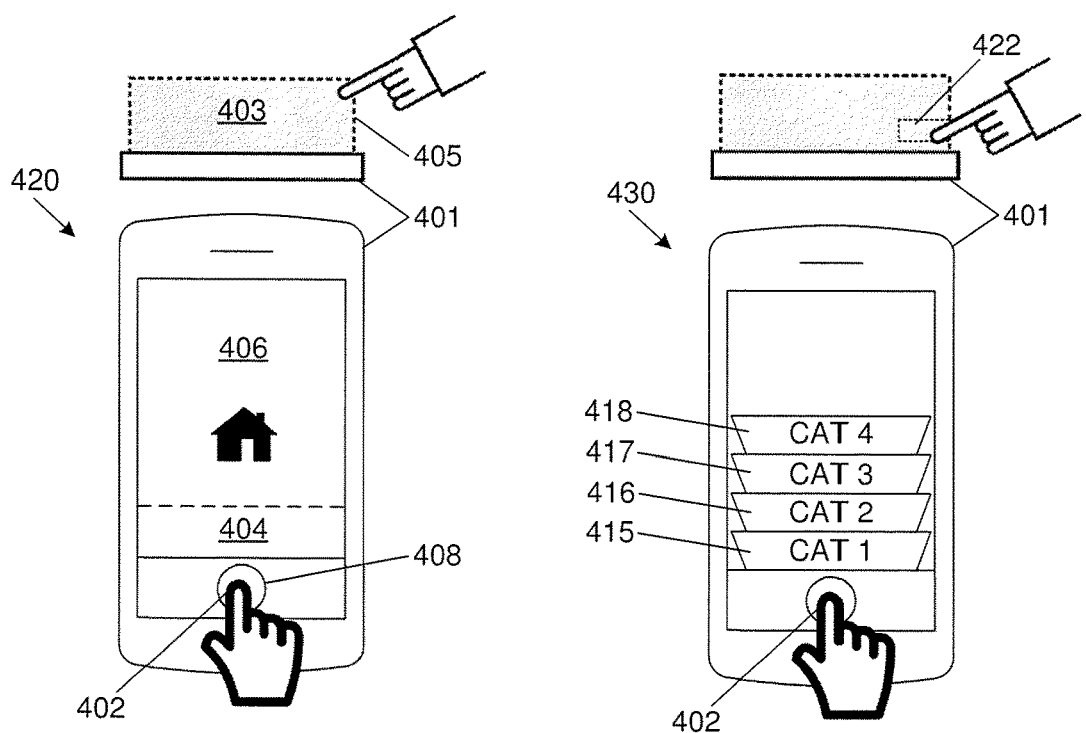
Figure 4B
Figure 4C

Figure 5CFigure 5D

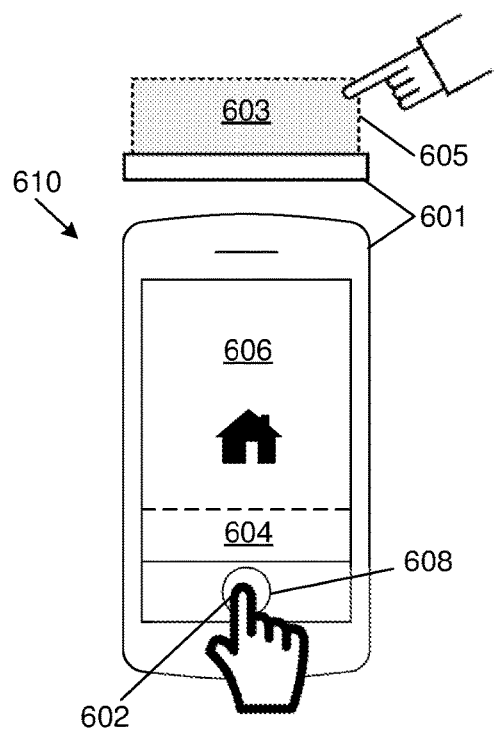
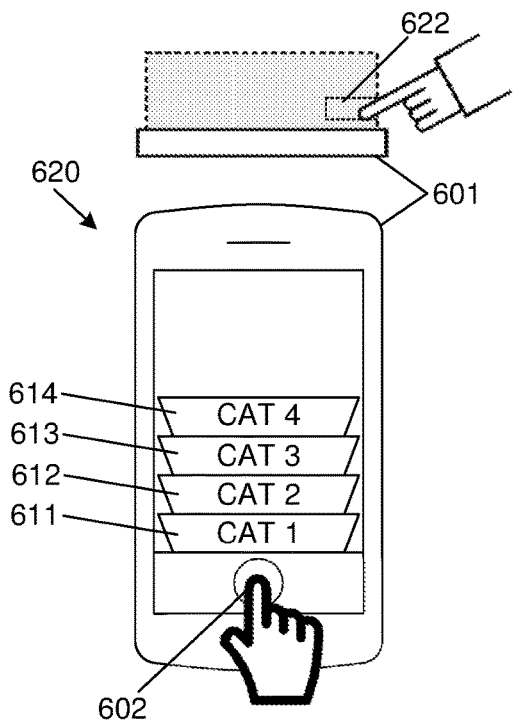
Figure 6A
Figure 6B
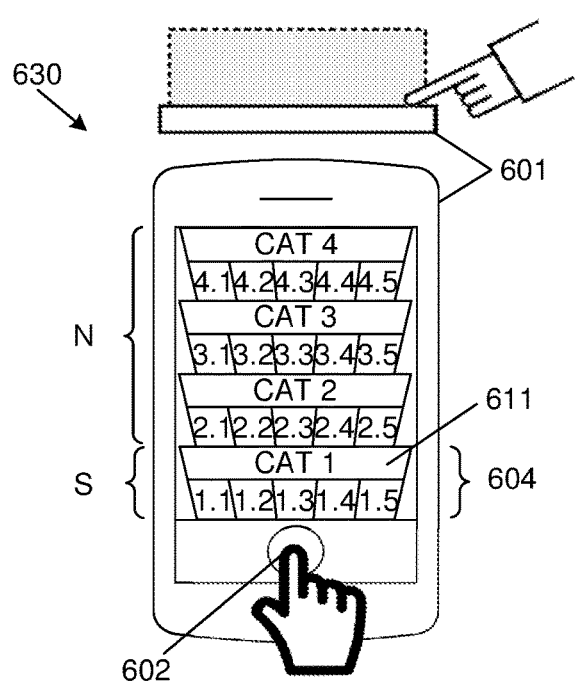
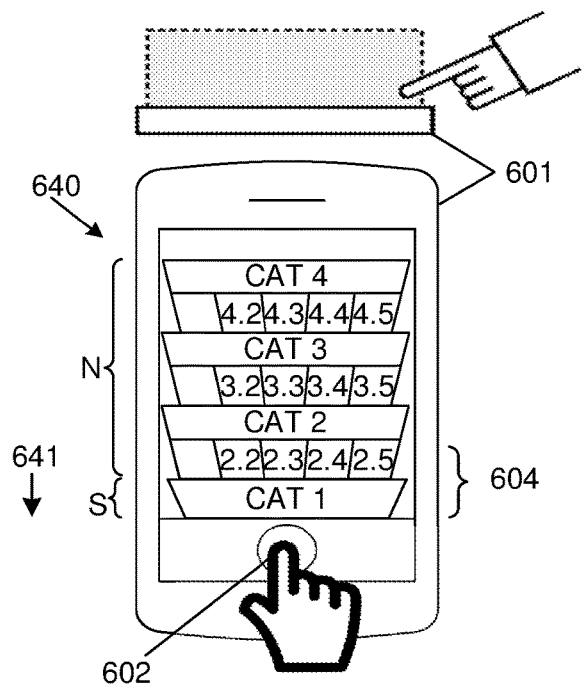
Figure 6C
Figure 6D

DYNAMICALLY POPULATING A DISPLAY AND ENTERING A SELECTION INTERACTION MODE BASED ON MOVEMENT OF A POINTER ALONG A NAVIGATION PATH

CROSS-REFERENCE TO RELATED APPLICATIONS

This application claims priority to South African provisional patent application number 2014/04024 filed on 3 Jun. 2014, which is incorporated by reference herein.

FIELD OF THE INVENTION

This invention relates to human-computer interaction. More particularly, the invention relates to a method of display and interaction in a user interface of an electronic device.

BACKGROUND TO THE INVENTION

Electronic devices, such as personal computers, handheld computers, mobile phones, and the like, provide user interfaces allowing a user to navigate and select interactive items and trigger actions from the electronic device. Various methods have been developed for human-computer interaction, particularly for displaying and interacting with interactive items such as information elements, objects, actions and events, displayed in a display region associated with the user interface.

Point and click mechanisms are typically used in a conventional graphical user interface (GUI).

In these implementations, a user commonly uses a pointing device such as a mouse or touch pad to navigate menus of interactive items, and select desired interactive items by, for example, pressing or clicking the pointing device.

A problem with conventional user interfaces of the type described above is that they may be largely object-oriented. The input of a user is typically mapped to a display region of the electronic device and then interpreted in relation to interactive items displayed in the display region at a given time. In conventional GUIs, relatively little response is provided to movement and/or positioning of a pointer before the user ultimately makes a selection. Moreover, the efficiency of these user interfaces may be unsatisfactory, as many repetitions of "point and click" may be required to select a desired interactive item.

More recently, GUIs have been developed wherein a user is capable of navigating menus of interactive items without being required to press or click to indicate a particular selection. An example of such a GUI is referred to as a crossing-based interface (CBI). CBIs typically make use of thresholds provided in a control region of the user interface, wherein crossing of a certain threshold by a pointer triggers discrete actions from the electronic device. A user may, for example, cycle through sets of interactive items displayed in the display region through swiping movements within the control region.

In CBI implementations, greater response is provided to movement and/or positioning of a pointer, the pointer typically being either a cursor in the display region or a body part of the user. The need for a user to press or click to indicate a selection may therefore be obviated to a certain degree. However, a disadvantage of such interfaces may be that items displayed in the display region at a given time are relatively static and/or inert. For example, a user may be required to move a pointer beyond a threshold provided by a certain item in the display region before a further item or items are displayed in the display region. Accordingly, navigating menus and selecting a desired interactive item may still be a cumbersome task.

The present invention aims to alleviate these and other problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a method of display and interaction in a user interface of an electronic device, comprising the steps of:
 providing a display region of the user interface;
 providing a control region of the user interface, wherein the control region includes a navigation region within the control region;
 in response to receiving a predefined interaction from a pointer of a user in the control region, initiating display of a number of interactive items in the display region;
 tracking one or both of: position and movement of the pointer within the control region;
 in response to the pointer moving in the navigation region, dynamically populating the display region with a subset of the interactive items selected from a predefined set of interactive items, wherein the subset of interactive items populating the display region at a given time is based on a position or movement of the pointer in the navigation region; and
 in response to detecting either a substantial change of direction of the pointer within the navigation region or the pointer reaching a selection threshold of the navigation region, entering a selection interaction mode in which the user is able to individually interact with each of the interactive items within the subset of interactive items populating the display region.

The display region is a two-dimensional region located in an x-y plane of the user interface. In one embodiment, the control region is also a two-dimensional region located in an x-y plane of the user interface. In a different embodiment, the control region is a three-dimensional region which includes a portion of the x-y plane of the user interface and which extends perpendicularly from the x-y plane along a z-axis.

Further features provide for tracking position or movement of the pointer within the control region to include tracking movement along a predefined axis in the control region; for movement of the pointer in a first direction along the predefined axis to cause the display region to be dynamically populated with interactive items; and for the substantial change of direction of the pointer within the navigation region to be moving the pointer in a second, opposite direction along the predefined axis. The pre-defined axis may be the z-axis.

Further features provide for dynamically populating the display region to include increasing or decreasing the number of interactive items displayed in the display region.

In one embodiment, the predefined interaction is the pointer entering the navigation region. In a different embodiment, the predefined interaction is selection of a physical or virtual button of the user interface. The button may be a home button of the user interface.

Further features provide for the method to include the step of:

in response to determining that the pointer has reached a terminal threshold of the navigation region, removing the interactive items from the display region, overriding the selection interaction mode, and causing a home screen to be displayed.

Yet further features of the invention provide for the pointer of the user to be either a cursor provided by the user interface, or the position, movement or touch of a pointing tool or the body of the user in the control region; and for the navigation region to extend through the x-y plane and at least partially along the z-axis. The terminal threshold may be when the pointer is moved beyond an end point of the navigation region.

A further feature provides that, once the selection interaction mode is entered, no further interactive elements are added to the display region and the interactive items populating the display are presented in a suitable format such that the user is user is able to individually interact with each of the interactive items within the subset of interactive items populating the display region.

Further features provide for the navigation region to include a plurality of category thresholds each being associated with a category that includes a subset of interactive items; for dynamically populating the display region associated with a subset of the interactive items to include determining that the pointer has reached a particular category threshold, designating the category threshold as an active threshold, and populating the display region with interactive items associated with the category corresponding to the active threshold. The movement or change in position of the pointer in the navigation region may cause the display region to cycle through the subsets of interactive items; and entering the selection interaction mode may include allowing the user to individually interact with the subset of interactive items corresponding to the active threshold.

Still further features of the invention provide for the step of dynamically populating the display region to further include: determining that the pointer has reached a further category threshold within the navigation region, designating the further category threshold as the active threshold, and populating the display region with interactive items of the subset corresponding to the active threshold.

Yet further features of the invention provide for the step of designating the further category threshold as the active threshold to include: designating the category threshold reached prior to the further category threshold as a deactivated threshold, and removing from the display region interactive items of the subset corresponding to the deactivated threshold.

A further feature of the invention provides for at least some interactive items of the predefined set of interactive items not included in the subset populating the display region at a given time to be displayed in a preview display region. The preview display region may be adjacent the display region and may include one or more subsets corresponding to subsequent category thresholds in the navigation region.

Detecting a substantial change in direction or the reaching of a selection threshold may include detecting movement of the pointer through the navigation region to complete a virtual click.

Still further features provide for the step of dynamically populating the display region with a subset of the interactive items to include:

populating the display region with an initial subset of interactive items in response to the predefined interaction; and progressively adding additional interactive items to the subset or removing interactive items from the subset as the pointer moves or changes position in the navigation region.

Interactive items may be one or more of: information elements, objects, actions, applications and events; the pointer of a user may be selected from: a cursor provided by the user interface, a pointing tool of the user, or a finger of the user; and the electronic device may be one of: a mobile phone, a handheld computer, a personal computer, a television and a gaming controller. The display region may be a display of the electronic device.

The subset of interactive items populating the display region at a given time may be based on a position of the pointer along the navigation region in the z-axis, preferably above a predefined virtual or physical button in the x-y plane.

The invention extends to an electronic device comprising:

a user interface;

a control region component for providing a control region of the user interface, wherein the control region includes a navigation region within the control region;

an input receiving component for receiving a predefined interaction from a pointer of a user in the control region;

a triggering component for initiating display of a number of interactive items in a display region of the user interface in response to receiving the predefined interaction;

a tracking component for tracking one or both of: position and movement of the pointer within the control region;

a populating component for, in response to the pointer moving in the navigation region, dynamically populating the display region with a subset of the interactive items selected from a predefined set of interactive items, wherein the subset of interactive items populating the display region at a given time is based on a position or movement of the pointer in the navigation region;

a selection detecting component for detecting either a substantial change of direction of the pointer within the navigation region or the pointer reaching a selection threshold of the navigation region; and a selection interaction component for entering a selection interaction mode in which the user is able to individually interact with each of the interactive items within the subset of interactive items populating the display region.

The invention yet further extends to a computer program product for display and interaction in a user interface, the computer program product executable at an electronic device that includes a user interface and that comprises computer-readable medium having stored computer-readable program code for performing the steps of:

providing a display region of the user interface;

providing a control region of the user interface, wherein the control region includes a navigation region within the control region;

in response to receiving a predefined interaction from a pointer of a user in the control region, initiating display of a number of interactive items in the display region;

tracking one of both of: position and movement of the pointer within the control region;

in response to the pointer moving in the navigation region, dynamically populating the display region with a subset of the interactive items selected from a predefined set of interactive items, wherein the subset of interactive items populating the display region at a given time is based on a position or movement of the pointer in the navigation region; and in response to detecting either a substantial change of direction of the pointer within the navigation region or the pointer reaching a selection threshold of the navigation region, entering a selection interaction mode in which the user is able to individually interact with each of the interactive items within the subset of interactive items populating the display region.

The computer-readable medium may be a non-transitory computer-readable medium and the computer-readable program code may be executable by a processing circuit.

In order for the invention to be more fully understood, implementations thereof will now be described with reference to the accompanying drawings.

BRIEF DESCRIPTION OF THE DRAWINGS

The invention will now be described, by way of example only, with reference to the accompanying representations in which:

FIG. 4A is a schematic illustration of a navigation region having category thresholds in a control region employed in a second exemplary method of display and interaction in a user interface according to the invention;

FIGS. 4B to 4I are schematic illustrations of a series of steps conducted in the second exemplary method of display and interaction;

FIGS. 5A to 5E are schematic illustrations of a series of steps conducted in a third exemplary method of display and interaction in a user interface according to the invention; and, FIGS. 6A to 6G are schematic illustrations of a series of steps conducted in a fourth exemplary method of display and interaction in a user interface according to the invention.

DETAILED DESCRIPTION WITH REFERENCE TO THE DRAWINGS

Figure 1:
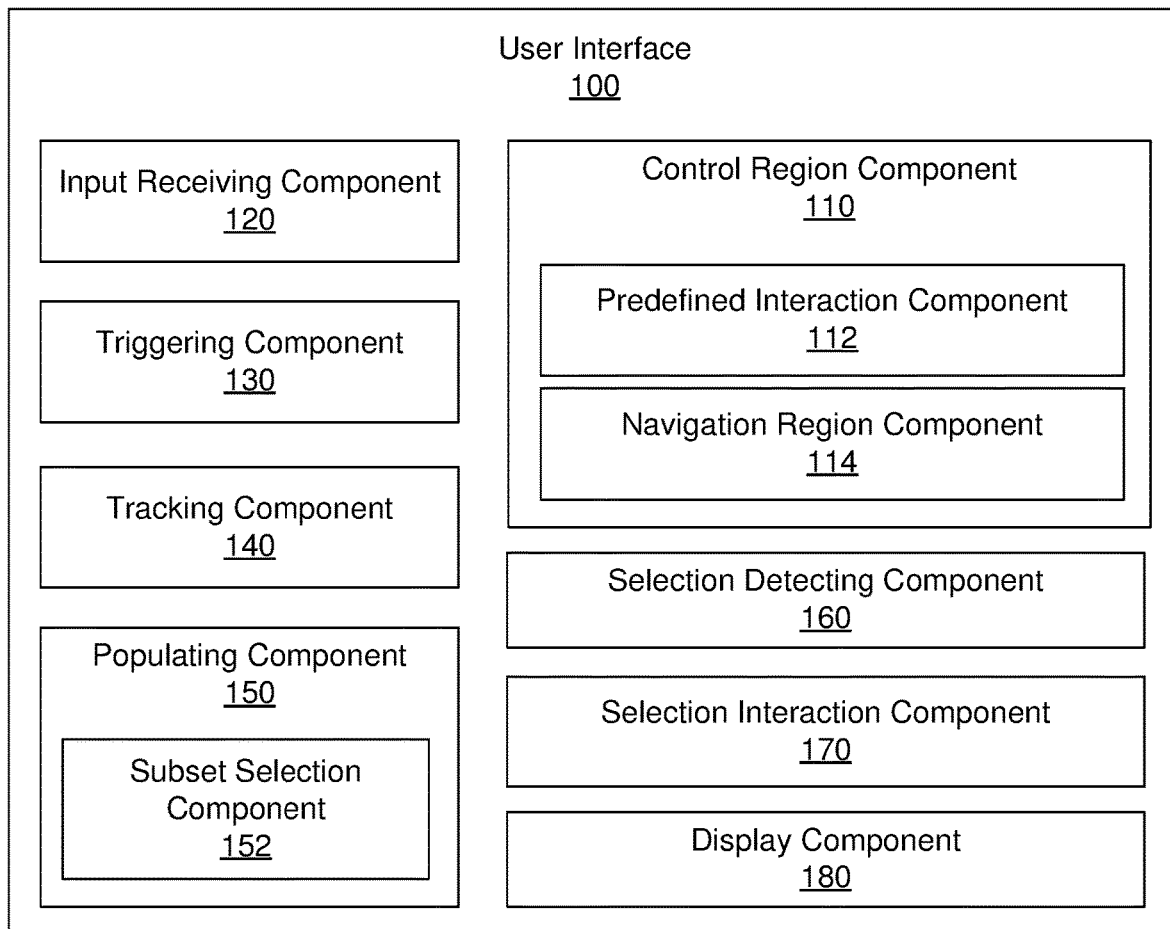
FIG. 1 is a block diagram illustrating logical components of an embodiment of a user interface of an electronic device according to the invention.

Logical components of an embodiment of a user interface (100) of an electronic device according to the invention are illustrated in FIG. 1. These logical components are representations of functional modules that comprise computer-executable instructions, data structures, program modules and other data, and are provided by a computer readable medium of the electronic device having stored program code executable by a processor of the electronic device. The electronic device may be a mobile phone, personal computer, a handheld or tablet computer, a television, a gaming controller or the like.

The user interface (100) comprises a control region component (110), an input receiving component (120), a triggering component (130), a tracking component (140), a populating component (150), a selection detecting component (160), a selection interaction component (170) and a display component (180).

The control region component (110) may include a predefined interaction component (112) and a navigation region component (114). The populating component (150) may include a subset selection component (152).

The user interface (100) is configured to display interactive items in a display region using the display component (180) and allow a user to navigate and select desired interactive items. The interactive items may include one or more of information elements, objects, actions, applications and events. The display region may be a display, as shown in the exemplary implementations herein, or a portion of the display of the electronic device.

Figure 2:
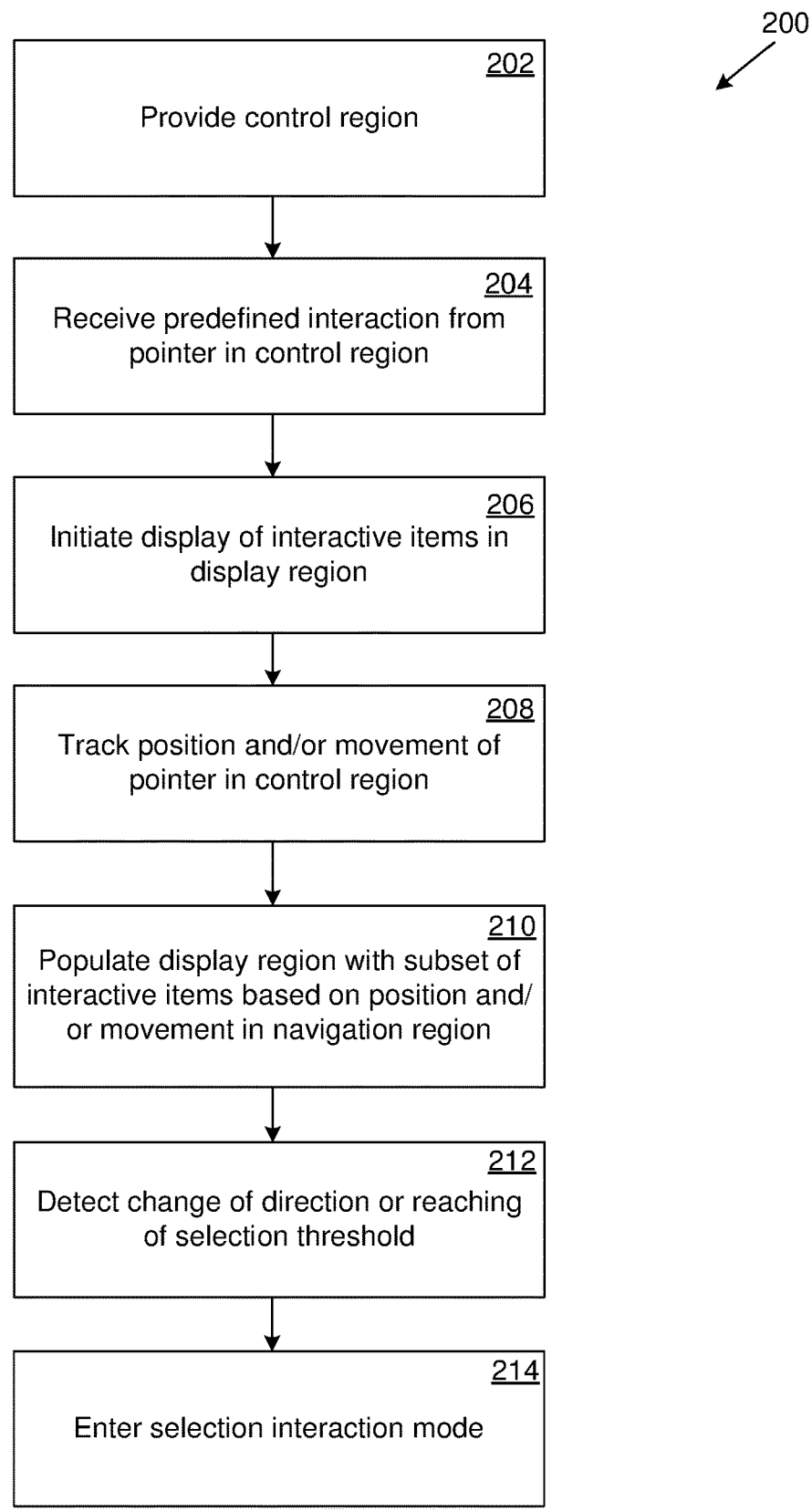
FIG. 2 is a flow diagram illustrating a method of display and interaction in a user interface according to the invention.

The flow diagram (200) of FIG. 2 illustrates a display and interaction method carried out at the user interface (100) described with reference to FIG. 1. At a first stage (202), a control region of the user interface (100) is provided using the control region component (110). At a next stage (204), a predefined interaction is received from a pointer of the user in the control region. Data relating to the predefined action may be stored in the predefined interaction component (112).

In response to receiving the predefined interaction from the pointer of the user, at a further stage (206), the triggering component (130) is used to initiate display of a number of interactive items in the display region associated with the user interface (100). At a next stage (208) and/or throughout any one or more other stages described with reference to FIG. 2, the tracking component (130) is used to track the position and/or movement of the pointer within the control region.

The navigation region component (114) of the control region component (110) provides a predefined navigation region located within the control region. In response to the pointer moving in the navigation region, at a next stage (210), the populating component (150) causes the display region to be dynamically populated with a subset of the interactive items. The interactive items displayed by way of the display component (180) are selected from the predefined set of interactive items, and the subset selection component (152) populates the display region with a specific subset of the interactive items at a given time, based on the position and/or the movement of the pointer in the navigation region at that time.

At a next stage (212), the selection detecting component (160) detects either a substantial change of direction of the pointer within the navigation region or that the pointer has reached a selection threshold of the navigation region. In response to detecting such a change or the reaching of a selection threshold, at a final stage (214), the selection interaction component (170) is employed to enter a selection interaction mode in which the user is able to individually interact with each of the interactive items within the subset of interactive items populating the display region.

Exemplary implementations of the invention will now be described with reference to FIGS. 3A to 6G. In the examples provided, the user interface is a user interface of a mobile phone. The user interface may, however, be the user interface of any suitable electronic device capable of displaying items and allowing a user to interact with and select the items, such as a personal computer, a handheld or tablet computer, a television, or the like. The display region may be a display, as shown in the exemplary implementations, a portion of the display of the electronic device.

A series of steps conducted in a first exemplary method of display and interaction in a user interface according to the invention is illustrated in FIGS. 3A to 3H. Each of the figures shows a side view positioned above a front view of a mobile device (301), and a finger of a user which acts as a pointer (302).

In this embodiment of the invention, the mobile phone (301) is capable of z-axis tracking and the control region (303) is a three-dimensional region which includes the display region (304). The display region (304) is located in an x-y plane of the control region (303) at a zero value point in the z-axis (305), and the control region (303) extends generally normally from the display region (304) along the z-axis (305) above the display region (304).

The display region (304) forms part of a touch sensitive display (306) of the mobile phone (301), in this embodiment is a portion of the touch sensitive display (306) below the broken line (307) in FIG. 3A. In embodiments of the invention, the display region (304) serves as a target area in a larger display area of an electronic device. The display region (304), or target area, indicates a currently active subset of interactive items for selection to a user, as will be described in greater detail below.

Figure 3A:
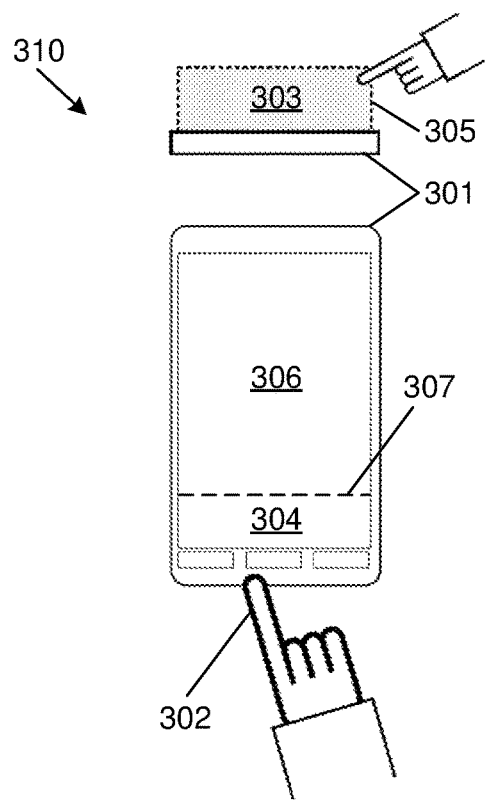
FIGS. 3A to 3H are schematic illustrations of a series of steps conducted in a first exemplary method of display and interaction in a user interface according to the invention.

FIG. 3A illustrates the control region (303) and the display region (304). The user interface is capable of tracking the position and movement of the pointer (302) in the control region (303). The mobile device (301) is equipped with z-axis tracking to enable the position and movement of the pointer (302) to be tracked in the x-axis, y-axis and z-axis within the control region (303).

Figure 3B:
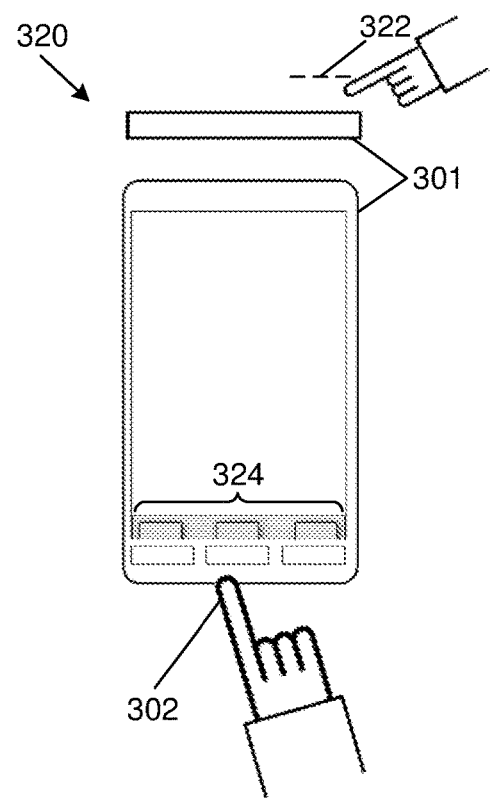

At a first stage (310), the pointer (302) enters the control region (303). At this stage, the pointer (302) is positioned at a high z-axis value and no interactive items are displayed in the display region (304). At a next stage (320), the pointer (302) crosses a predefined threshold (322) in the control region (303). Crossing of the predefined threshold (322) is a predefined interaction which initiates display of a number of interactive items (324) in the display region (304). FIG. 3B illustrates spawning of a first subset of interactive items (324) in the display region (304).

At a further stage (330), the pointer (302) reaches the zero value point in the z-axis, in other words, the finger of the user touches the mobile phone (301). In this embodiment, the user selects a physical "home" button (332) of the mobile phone (301). At this stage, spawning of the interactive items (324) is complete.

Figure 3C:
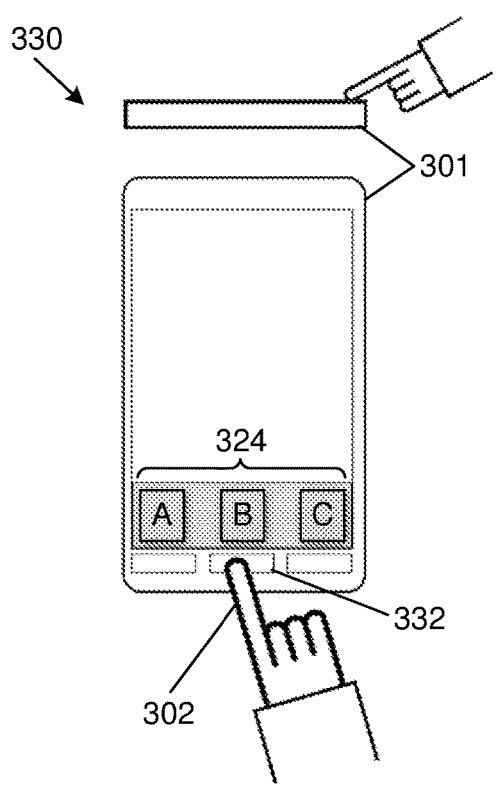

The interactive items (324) shown in FIG. 3C is an initial set of interactive items with which the display region (304) is populated in response to the predefined interaction, which is crossing of the predefined threshold (322) in this embodiment of the invention.

Figure 3D:
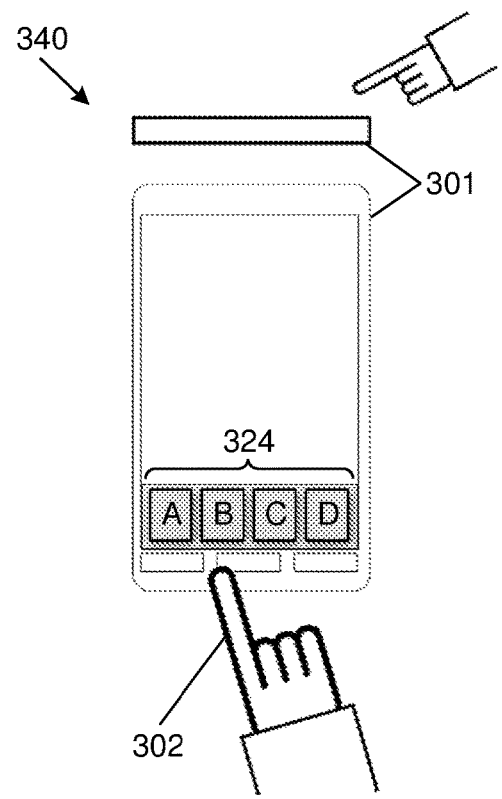
Figure 3E:
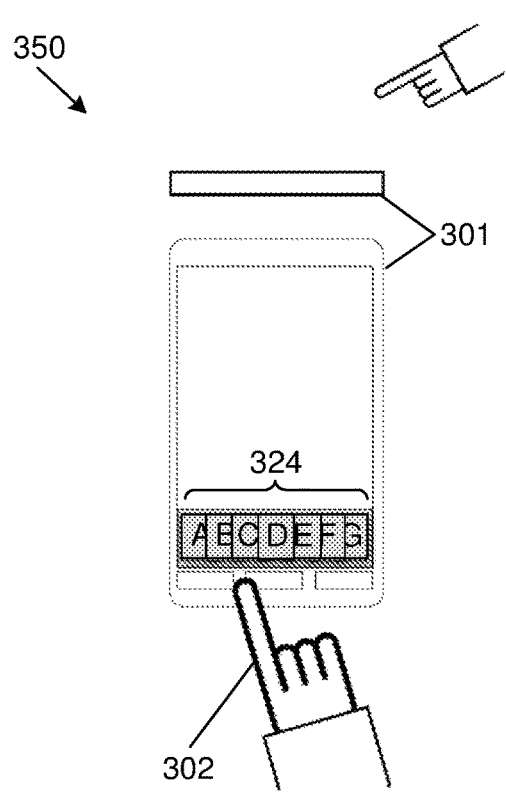
Figure 3F:
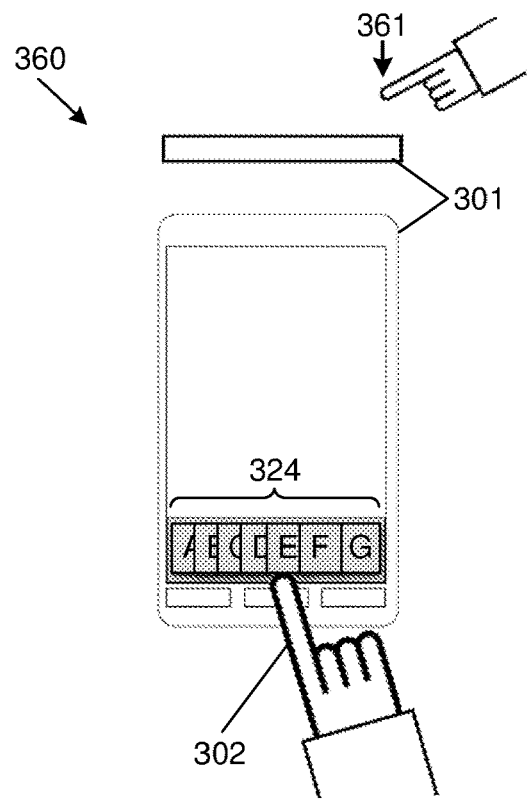

At a next stage (340), the pointer (302) is moved generally normally away from the display region (304) such that the value for the position of the pointer (302) in the z-axis increases, as illustrated in FIG. 3D. The pointer (302) moves along a navigation region, which is in this example defined so as to extend from the "home" button (332) along the z-axis to an outer boundary of the control region (303). The navigation region extends through a portion of the x-y plane and along the z-axis to create a three-dimensional region wherein the pointer (302) can be moved.

Movement of the pointer (302) in the navigation region results in dynamic population of the display region with a subset of the interactive items selected from a predefined set of interactive items. The predefined set may, for example, be all of the applications resident on the mobile phone (301). The subset of interactive items populating the display region at a given time is based on the position and movement of the pointer (302) in the navigation region, which is located within the control region (303). Based on the position of the pointer (302) illustrated in FIG. 3D, four interactive items ("A", "B", "C" and "D") populate the display region (304).

The navigation region of this embodiment has a predefined first direction which may be defined as movement from the "home" button substantially along the z-axis and generally away from the display.

In this embodiment, movement of the pointer (302) along the first direction in the navigation region, in other words away from the "home" button in the z-axis, results in interactive items being progressively added to the subset of interactive items displayed in the display region (304). It should be appreciated that, in alternative embodiments, interactive items may be progressively removed from the displayed subset as the pointer moves and/or changes position along the navigation region.

At a next stage (350), the pointer (302) is moved even further away from the "home" button along the z-axis. This causes more interactive elements ("A" to "G" in FIG. 3E) to be spawned in the display region (304).

Once the user is satisfied with the subset of interactive elements (324) displayed in the display region (304), the user either causes the pointer (302) to change direction in the navigation region or to reach a selection threshold of the navigation region, thereby entering a selection interaction mode in which the user is able to individually interact with the subset of interactive items (324) populating the display region (304) at that time.

In this embodiment, the change of direction of the pointer within the navigation region involves a substantial reversal of direction along a predefined axis (the z-axis). The user moves the pointer (302) in a second direction generally opposite the first direction of the navigation region at a further stage (360). As shown by the directional arrow (361) in FIG. 3F, the user enters the selection interaction mode by moving the pointer (302) closer to the display region (304) along the z-axis.

Once the selection interaction mode is entered, the dynamic population of the display region (304) is ceased such that no further interactive elements are added to the display region (304).

Figure 3G:
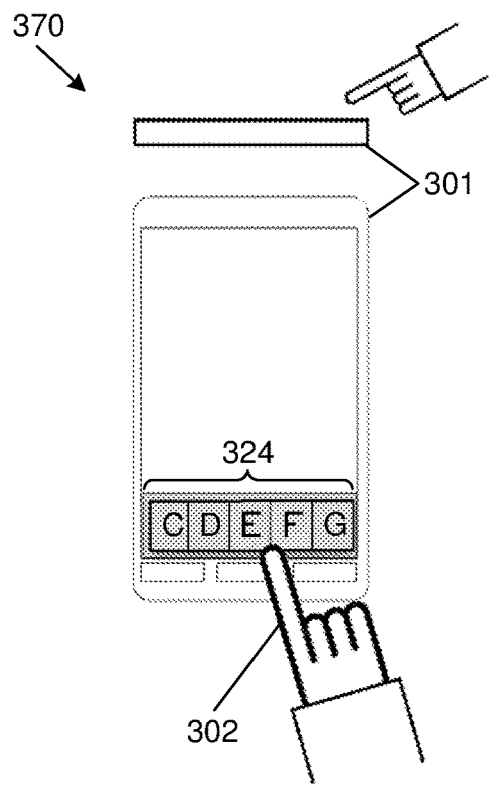
Figure 3H:
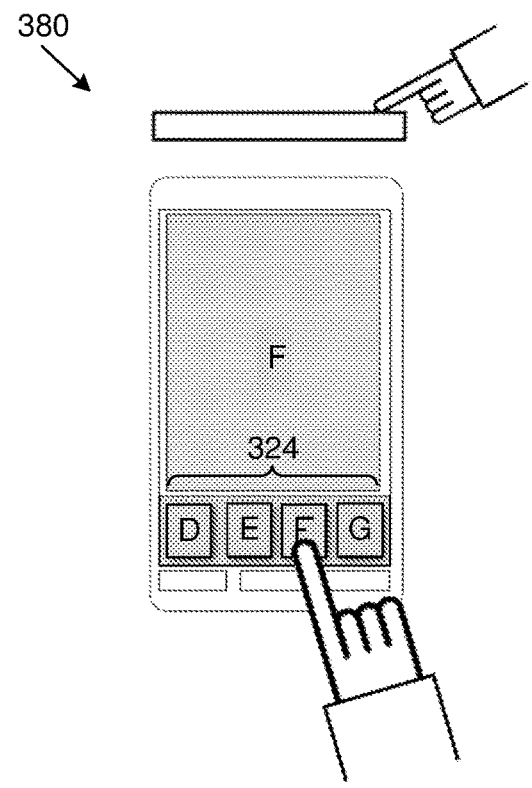

The selection interaction mode may allow the user to interact with individual interactive items in any suitable manner. In a preferred embodiment, and as shown in FIGS. 3G and 3H, the user interface is configured to employ an interaction style wherein a control trajectory is continuously interpreted and used to change object properties at a distance. This interaction style was introduced in Patent Cooperation Treaty (PCT) patent publication number WO2013049864, entitled "Method for Human-Computer Interaction on a Graphical User Interface", which is incorporated in its entirety by reference herein. It should be appreciated that any other suitable interaction style may be employed without departing from the scope of the invention.

At a next stage (370), the pointer (302) is moved closer to a desired interactive item displayed in the display region. The user interface determines the coordinates of the pointer (302), the coordinates of the interactive items displayed, and establishes a threshold in relation to the interactive items and in relation to space about them. The interactive items are prioritised in relation to their distance and/or direction to the pointer (302).

The highest priority may be given to an interactive item closest to the pointer and the lowest priority to the furthest. Each time the pointer (302) moves in the control region (303), the interactive items and thresholds are moved so as to change the display region (304) in accordance with the priority of each of the interactive items. The highest priority interactive items may be moved closer to the pointer and vice versa, and the lower priority objects may be moved away from the higher priority objects. Furthermore, the higher priority interactive items may be enlarged and vice versa. This style of interaction is illustrated in FIG. 3G, wherein interactive items "C" to "G" are enlarged while interactive items "A" and "B" are moved out of the display region (304) in response to movement of the pointer (302) in a certain manner.

At a final stage (380), the pointer (302) is moved so as to reach a zero value in the z-axis and interactive item "F" is selected. The selected interactive item may, for example, be an application which is opened on selection. In this embodiment, the interactive item "F" is an application which is opened and displayed in the remainder of the display of the mobile phone (301), as illustrated in FIG. 3H.

Figure 4D:
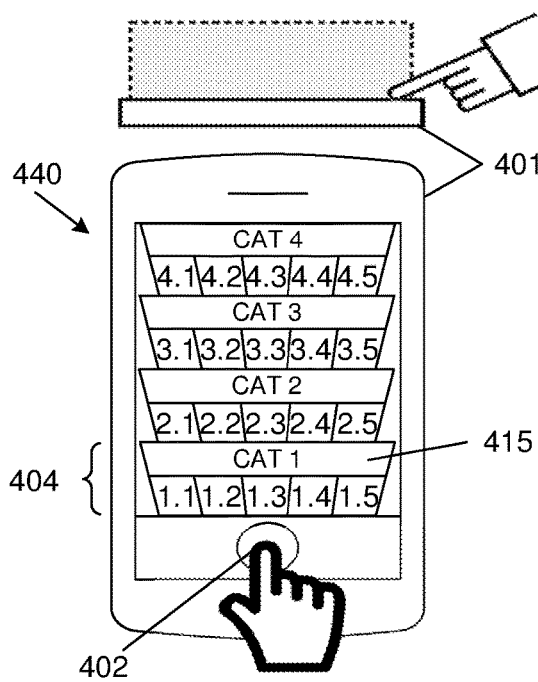
Figure 4E:
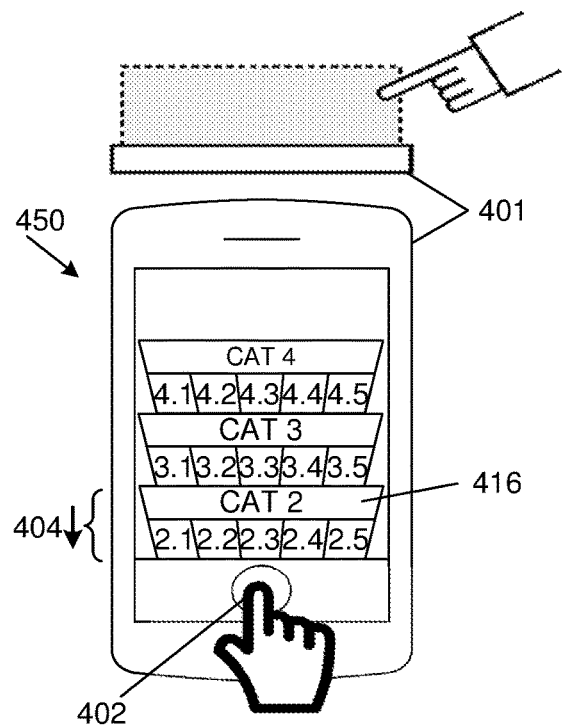

A navigation region (410) of an embodiment of the invention is shown in FIG. 4A, and a series of steps conducted in a second exemplary method of display and interaction in a user interface according to the invention is illustrated in FIGS. 4B to 4I, in which a navigation region of this type is employed.

Similarly to FIGS. 3A to 3H, each of FIGS. 4B to 4I shows a side view positioned above a front view of a mobile phone (401). The mobile phone (401) is capable of z-axis tracking, in this case tracking of the finger of a user which acts as a pointer (402), and the control region (403) is a three-dimensional region which includes the display region (404). The display region (404) is located in an x-y plane of the control region (403) at a zero value point in the z-axis, and the control region (403) extends generally normally from the display region along a z-axis (405) above the display region (404). These regions are best illustrated in FIG. 4B.

The navigation region (410) of this exemplary method is similar to the navigation region described with reference to FIGS. 3A to 3H. However, in this example, the navigation region (410) has an essentially frustoconical shape and extends from a virtual button (408) on the touch sensitive display instead of from a physical button. The navigation region (410) is thus a volume, a side view of which is illustrated in detail in FIG. 4A. The subset of interactive items populating the display region at a given time is based on a position of the pointer along the navigation region (410) in the z-axis, and generally above the virtual button (408).

Furthermore, the navigation region (410) of this embodiment includes a plurality of category thresholds (411, 412, 413, 414) each being associated with a category (415, 416, 417, 418) which includes a subset of interactive items. The navigation region (410) ends in a terminal threshold (419). Movement and/or change in the position of the pointer (402) along the navigation region (410) causes the display region (404) to cycle through subsets of interactive items, each subset being associated with a particular category threshold (411, 412, 413, 414).

At a first stage (420), illustrated in FIG. 4B, the pointer (402) enters the control region (403). At this stage, the pointer (402) is positioned at a high z-axis value and no interactive items are displayed in the display region (404). A home screen may be displayed at this stage.

At a next stage (430), the pointer (402) enters a predefined zone (422) in the control region (403). Entering of the predefined zone (422) is a predefined interaction which initiates display of the categories (415, 416, 417, 418) on the display of the mobile phone (401). The spawning of the categories is illustrated in FIG. 4C. The predefined interaction may also be provided by the pointer simply entering the control region (403).

At a next stage (440), once the pointer (402) reaches the virtual button (408), the categories are fully displayed on the display (406), with a first category (415) being displayed in the display region (404), as indicated in FIG. 4D.

Each category contains a subset of interactive items. For example, the first category (415) may contain a set of applications selected as "favourites" by the user, a second category (416) may contain all of the applications available, a third category (417) may contain system items, and a fourth category (418) may contain device options.

Selection of the virtual button (408) designates a first category threshold (411) as an active threshold. The first category (415) is associated with the first category threshold (411), which means that the subset of interactive items of the first category (415) are displayed in the display region (404) when the first category threshold (411) is the active threshold.

As the pointer (402) is moved away from the virtual button (408) along the navigation region (410), it crosses a second category threshold (412) at a next stage (450). The user interface determines that the pointer (402) has reached the second category threshold (412), designates the second category threshold (412) as the active threshold, designates the first category threshold (411) as a deactivated threshold, and populates the display region (404) with interactive items associated with the second category threshold (412). Once the pointer (402) crosses the second category threshold (412), the first category (415) is removed from the display region (404) and the second category (416) is displayed therein.

The user can continue cycling through the categories in this manner. Each time a threshold is crossed, the user interface determines that the pointer (402) has reached a further category threshold within the navigation region (410), designates the further category threshold as the new active threshold, and this triggers the display region (404) to be populated with interactive items of the subset corresponding to the active threshold.

Each time a new threshold is reached, the user interface may designate the category threshold reached prior to the further category threshold as a deactivated threshold, and remove interactive items of the subset corresponding to the deactivated threshold from the display region (404) or from the entire display (406).

The interactive items and/or categories not included in the subset populating the display region (404) at a given time may be displayed in a remainder of the display (406) of the mobile phone (401) which is used as a preview display region. In this embodiment, the preview display region is adjacent the display region (404) and may include one or more subsets corresponding to subsequent category thresholds along the navigation region (410). This permits the user to view upcoming categories for selection which will become selectable targets once the pointer (402) is moved further along the navigation region (410).

Figure 4F:
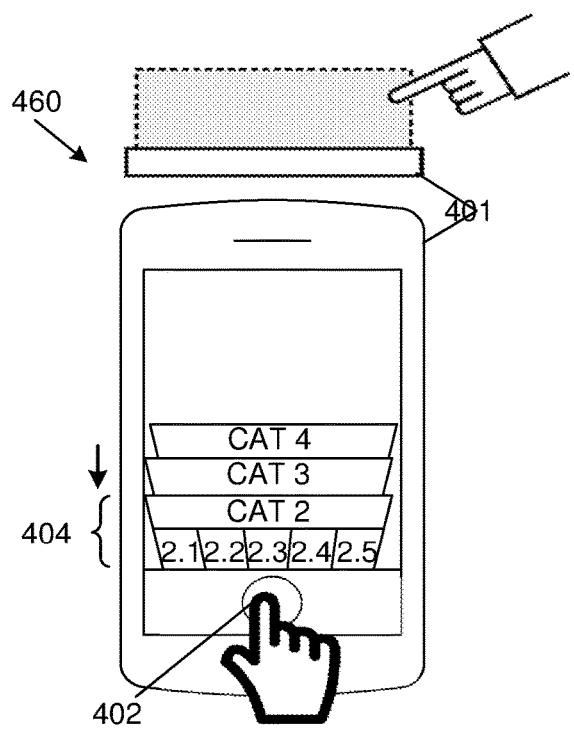
Figure 4G:
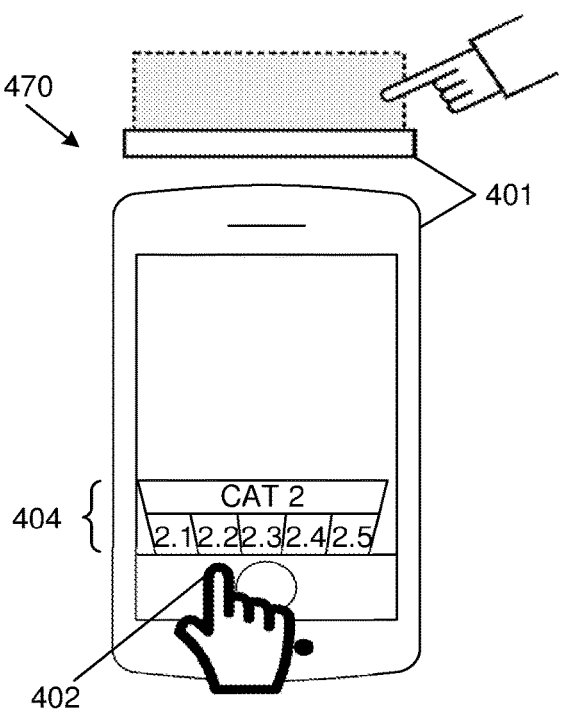

The category designated as the active category at a given time can be accessed by the user by causing the pointer (402) to substantially change direction in the navigation region (410). At a next stage (460), the user reverses the direction of pointer movement so as to move in a direction generally opposite the predefined populating direction and in order to effect this change of direction. In response to detecting that the pointer has changed direction to a predefined extent or substantial degree, a selection interaction mode is entered in which the user is able to individually interact with the subset of interactive items populating the display region. As shown in FIGS. 4F and 4G, the categories which are not designated as active are dynamically removed from the display and only the active category remains.

The selection interaction mode may also be entered by simply moving the pointer out of the navigation region (410) and/or into a different portion of the control region (403).

At a next stage (470), the user is allowed to individually interact with the subset of interactive items corresponding to the active threshold, in this case the interactive items ("2.1" to "2.5") of the second category (416). Interaction may occur in any suitable manner, for example, using the interaction style as described with reference to FIGS. 3A to 3H. The interactive items of the active category may in some embodiments be displayed in a standard static GUI format such that the user is capable of using the pointer to select a desired item.

Figure 4H:
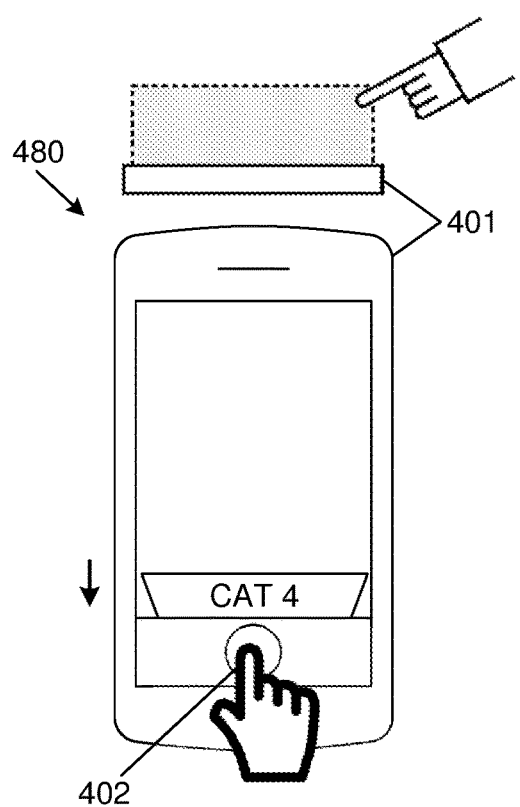
Figure 4I:
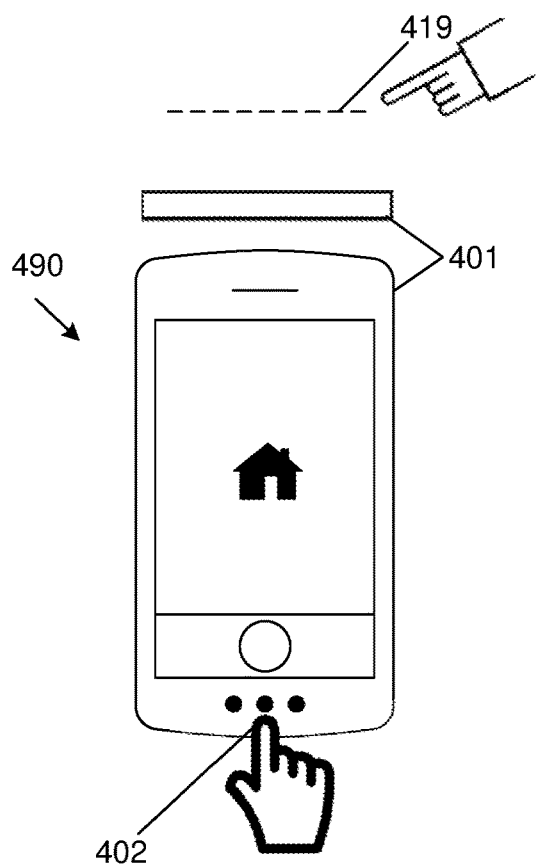

FIGS. 4H and 4I illustrate the manner in which the operation of entering the selection interaction mode may be stopped by moving the pointer past the terminal threshold (419). At one stage (480), the pointer (402) is moved along the navigation region, in the predefined populating direction, such that all of the categories are cycled through. Once the pointer (402) reaches the terminal threshold (419), as indicated at a further stage (490), interactive items are removed from the display region (404) and a home screen is displayed once more.

In this embodiment, reaching the terminal threshold overrides entering of the selection interaction mode, and also causes a home screen to be displayed. The terminal threshold may be reached when the pointer is moved past an end point of the navigation region and/or the control region.

A series of steps conducted in a third exemplary method of display and interaction in a user interface according to the invention is illustrated in FIGS. 5A to 5E.

Each of the figures shows a mobile device (501), and a finger of a user which acts as a pointer (502). In this embodiment of the invention, the mobile phone (501) is not capable of z-axis tracking and the control region (503) is a two-dimensional touch sensitive display. In this embodiment, the display region (504) forms the majority of the touch sensitive display.

The navigation region (505) of this embodiment extends in a two-dimensional region along the touch sensitive display, adjacent the display region (504). The navigation region (505) has a predefined populating direction (506) indicated by the directional arrows in FIG. 5A.

Figure 5A:
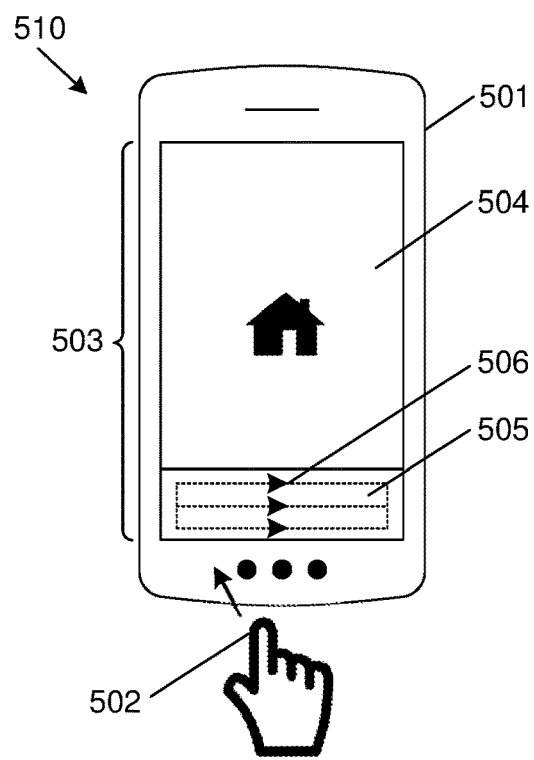
Figure 5B:
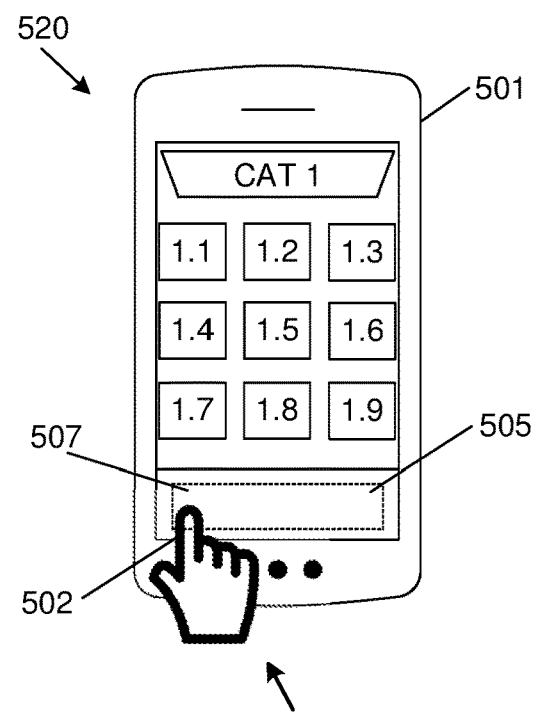

At a first stage (510), the pointer (502) is not in the navigation region (505) and a home screen is displayed. At a further stage (520), as shown in FIG. 5B, the pointer (502) is moved until it contacts an initiating region (507) of the navigation region (505).

Contacting the initiating region (507) is a predefined interaction that causes the user interface to populate the display region (504) with a first subset of interactive items. In this embodiment, the first subset is a first category of items.

At a next stage (530), as the pointer (502) is moved from the initiating region (507) along the navigation region (505), the movement and position of the pointer (502) is tracked and the display region (504) is dynamically populated with interactive items based on the movement and position of the pointer at a given time. FIG. 5C illustrates how a second category of interactive items populates the display region (504) once the pointer (502) reaches a central region of the navigation region (505).

The mobile phone (501) of this example is not capable of z-axis tracking, and the finger of the user therefore slides along the touch sensitive display to perform navigation.

Figure 5E:
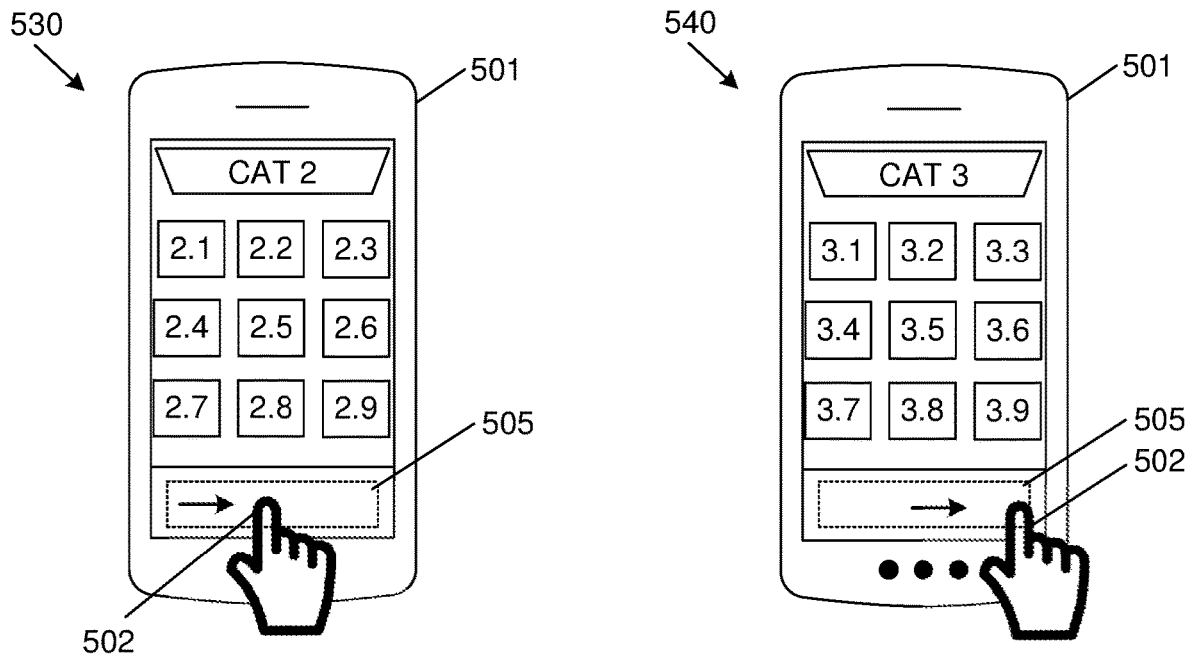
Figure 5E:
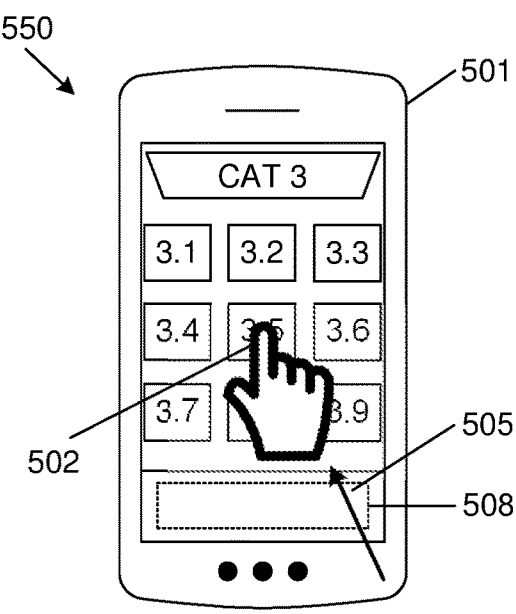

At a further stage (540), the pointer (502) is moved even further along the navigation region (505) and a third category is spawned. The user wishes to individually interact with interactive items in this category, and, at a final stage (550), changes direction in relation to the populating direction in the navigation region (505) by moving the pointer (502) in the direction of a desired interactive item (in this case, "3.5"). The user may, for example, lift the finger up from the navigation region (505) and press the touch sensitive display in the region where "3.5" is indicated in FIG. 5E.

An end boundary (508) of the navigation region (505) may be a terminal threshold. In such a case, moving the pointer (502) past the terminal threshold may typically override entering of the selection interaction mode, and a home screen may be displayed once more.

A series of steps conducted in a fourth exemplary method of display and interaction in a user interface according to the invention is illustrated in FIGS. 6A to 6G. In this example, the use of "virtual clicks" in an implementation of the invention is described.

Each of FIGS. 6A to 6G shows a side view positioned above a front view of a mobile phone (601). The mobile phone (601) is capable of z-axis tracking, in this case tracking of the finger of a user which acts as a pointer (602), and the control region (603) is a three-dimensional region which includes the display region (604).

Similarly to the example illustrated in FIGS. 4B to 4I, movement and/or change in the position of the pointer (602) along the z-axis causes the display region (604) to cycle through subsets of interactive items, each subset being associated with a particular category (611, 612, 613, 614).

At a first stage (610), illustrated in FIG. 6A, the pointer (602) enters the control region (603). At this stage, the pointer (602) is positioned at a high z-axis value and no interactive items are displayed in the display region (604). A home screen may be displayed at this stage.

At a next stage (620), the pointer (602) enters a predefined zone (622) in the control region (603). Entering of the predefined zone (622) is a predefined interaction which initiates display of the categories (611, 612, 613, 614) on the display (606) of the mobile phone (601). The spawning of the categories is illustrated in FIG. 6B.

At a next stage (630), once the pointer (602) reaches the virtual button (608), the categories are fully displayed on the display (606), with a first category (611) being displayed in a selection zone (S), and the other three categories being displayed in a navigation zone (N), as shown in FIG. 6C. At this stage, the selection zone (S) has a length equal to a breadth of the display region (604). At this stage, the selection zone (S) length is defined as a length of "1".

At a next stage (640), the pointer (602) moves away from the home button, which causes the first category (611) to start sliding out of the display region (604) in the direction of the directional arrow (641) in FIG. 6D. The selection zone (S) length gradually decreases as the pointer (602) is moved in the populating direction of the navigation region.

Figure 6E:
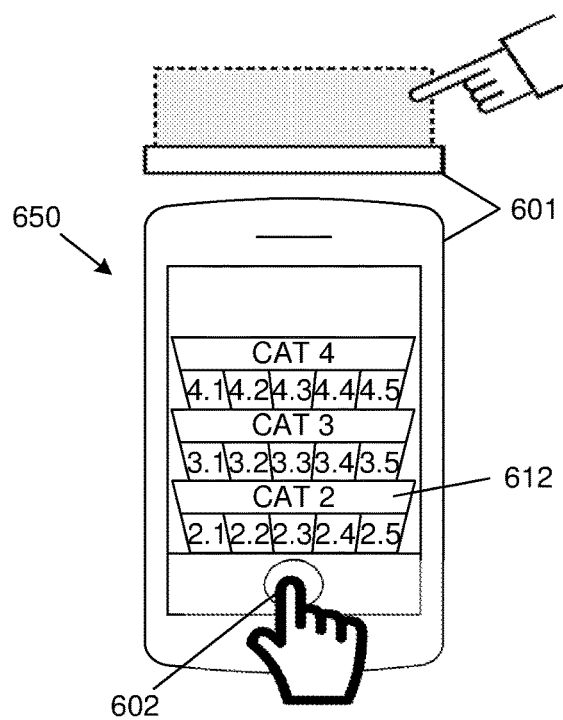

Once the pointer (602) is moved far enough away from the home button to cause the selection zone (S) length to become zero, a "virtual click" occurs. The virtual click represents a user's decision to remove the first category (611) from the available options for interaction. Once the selection zone (S) has decreased from 1 to 0, the relevant category is no longer available for selection and a virtual click has been performed. This is indicated in FIG. 6E, which illustrates a next stage (650) wherein the first category has been fully removed from the display region (604) after the completion of the virtual click.

Figure 6F:
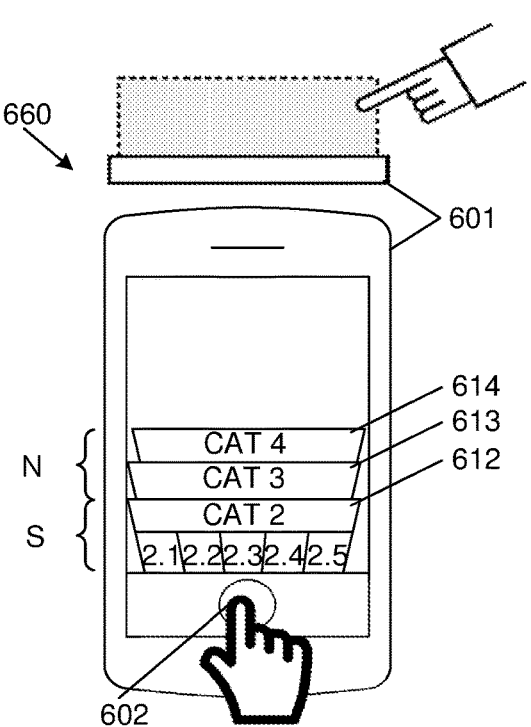

At a next stage (660), the user reverses the direction of the pointer (602) while the second category (612) is in the display region (604). The remaining categories (613, 614) are continuously moved behind the second category (612). Moving the pointer (602) closer to the home button causes a navigation zone (N) length, which corresponds to the combined breadth of the remaining categories (613, 614), to gradually decrease, as illustrated in FIG. 6F. Similarly to the virtual click described above, once the navigation zone (N) length becomes zero, a virtual click is completed so as to confirm the selection of the second category (612). This will initiate the selection interaction mode as described above.

However, if the user changes the direction of the pointer (602) so as to move the pointer (602) away from the home button before the navigation zone (N) length becomes zero, the selection is reversed and all three of the categories (612, 613, 614) are available for selection once more. This may aid in ensuring that a particular category is not accidentally selected through a relatively small directional change of the pointer.

Figure 6G:
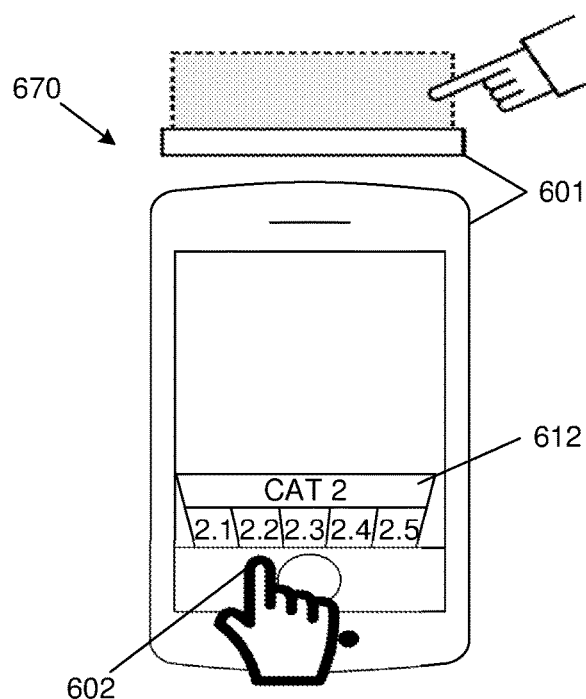

FIG. 6G illustrates a final stage (670) wherein the pointer (602) has been moved closer to the home button until the navigation zone (N) length has become zero and the remaining categories (613, 614) are removed from the display and disappears behind the second category (612) in the display region (604). Once the navigation zone (N) length becomes zero, a further virtual click is thus completed. In this example, the selection interaction mode is only entered once this virtual click is completed, and not as soon as there is a change of direction of the pointer. The use of a virtual click allows a user to confirm a selection without being required to physically click a button.

A method of display and interaction in a user interface of an electronic device, and a user interface configured to carry out such a method is therefore provided. The method allows an electronic device to dynamically populate a display region with interactive items for selection based on the movement and/or position of a pointer at a given time.

The method and interface of the present invention may provide greater efficiency in human-computer interaction in that the interface continuously responds to movement and/or positioning of a pointer before a user ultimately makes a selection. This may simplify and/or enhance such interaction, as interactive items displayed are adapted according to the intention of the user by tracking position and movement.

Conventional repetitions of "point and click" or time-consuming navigation of multiple menus and/or submenus may be significantly reduced or completely eliminated. Furthermore, the method and interface may allow for smoother and more dynamic human-computer interaction.

The above description is by way of example only and it should be appreciated that numerous changes and modifications may be made to the embodiments described without departing from the scope of the invention. The control region may be either a two-dimensional or a three-dimensional region. The pointer of the user may be any suitable pointer, for example, a cursor provided by the user interface and controlled by an input device such as a mouse, or the position, movement and/or touch of a pointing tool or the body of the user in the control region.

The navigation region is not limited to any specific direction or dimensions. In embodiments of the invention, the navigation region extends at least partially along a z-axis as well as through the x-y plane. The navigation region may have more than one direction which causes the display region to be dynamically populated with interactive items. Movement in the navigation region may in some embodiments be movement along a predefined axis. In such cases, moving in the populating region along the axis causes spawning of interactive items, while the selection interaction mode may be entered when the pointer reverses its direction of movement along the axis or reaches a threshold along the axis.

Movement along the navigation region, which causes population of the display region, may be defined as movement along a navigation path. In embodiments of the invention, the navigation path is a path created a posteriori, as opposed to a path that exists a priori. In other words, the navigation path may be created by the movement of the pointer instead of being a path which has predefined coordinates within the control region and/or navigation region.

In the examples described above, movement and/or positioning of the pointer within the navigation region is not constrained and a navigation path is thus traced a posteriori. This a posteriori path is tracked by a tracking component of the user interface, and the display region is populated accordingly.

Implementation of the present invention does therefore not require a specific reference path to be defined against which movement of the pointer is checked. Instead, the display region is populated through movement in the navigation region, typically along an axis and in a predefined direction or directions, and the selection interaction mode is entered once the user interface detects a substantial change of direction of the pointer within the navigation region or the pointer reaching a selection threshold of the navigation region The predefined interaction which initiates population of the display region with interactive items may include selection of either a physical or virtual button in the control region, and may occur in the z-axis, for example, above the display region or a button. The button may be provided by a "home" button or any other physical or virtual button presented in the x-y plane.

The phrase "dynamically populating the display region" may include increasing or decreasing the number of interactive items displayed in the display region, removing interactive items, and/or cycling through subsets of interactive items each having a predefined number of interactive items therein.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or flash drive or an optical medium such as a CD-ROM.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method of display and interaction in a user interface of an electronic device, comprising the steps of:
   providing a display region of the user interface on a display of the electronic device, the display region comprising a two-dimensional region located in an x-y plane of the display of the electronic device;
   providing a control region of the user interface, wherein the control region includes a navigation region within the control region, the control region comprising a three-dimensional region above the display region that extends perpendicularly from the x-y plane of the display of the electronic device along a z-axis measuring three or more points of distance above the x-y plane of the electronic device, where a second point is further from the x-y plane than a third point, but closer to the x-y plane than a first point;
   receiving a predefined interaction from a pointer of a user;
   in response to receiving the predefined interaction from a pointer of a user, initiating display of a number of interactive items in the display region;
   tracking one or both of position and movement of the pointer within the control region above the display region on the display of the electronic device;
   in response to the pointer moving in a first direction along a navigation path along the z-axis of the control region in the navigation region within the control region above the display region on the display of the electronic device without the pointer contacting the display of the electronic device, dynamically populating the display region by progressively adding interactive items or progressively removing interactive items from the number of interactive items displayed in the display region as the pointer moves in the first direction along the navigation path, wherein the number of interactive items populating the display region at a given time is based on the movement of the pointer in the first direction along the navigation path;
   checking, at each point along the z-axis passed by the navigation path, whether the pointer's movement is a substantial reversal of direction of the pointer's movement or position by the pointer moving in a second direction along the z-axis of the control region that is opposite to the first direction;
   detecting a substantial reversal of direction in the pointer's movement at the first point of the z-axis or at the third point of the z-axis; and
   in response to detecting a substantial reversal of direction of the pointer's movement, entering a selection interaction mode in which no further interactive items are added to or removed from the display region, where interactive items in the selection interaction mode each have a priority dynamically determined from their respective distances from the pointer and interactive items populating the display region are dynamically resized and repositioned relative to each other based on their priorities.

2. The method as claimed in claim 1, wherein the navigation path is a predefined axis in the control region, and wherein movement of the pointer in the first direction along the predefined axis causes the display region to be dynamically populated by progressively adding interactive items or progressively removing interactive items from the number of interactive items displayed in the display region, and wherein the substantial reversal of direction of the pointer's movement along the predefined axis is movement of the pointer in the second direction along the predefined axis that is opposite to the first direction.

3. The method as claimed in claim 2, wherein the predefined axis is the z-axis.

4. The method as claimed in claim 1, wherein the predefined interaction is the pointer entering the navigation region.

5. The method as claimed in claim 1, wherein the predefined interaction is selection of a physical or virtual button of the user interface.

6. The method as claimed in claim 5, wherein the button is a home button of the user interface.

7. The method as claimed in claim 1, including the step of:
   in response to determining that the pointer has reached a terminal threshold of the navigation region, removing all interactive items from the display region, overriding the selection interaction mode, and causing a home screen to be displayed.

8. The method as claimed in claim 7, wherein the terminal threshold is reached when the pointer is moved beyond an end point of the navigation region.

9. The method as claimed in claim 1, wherein the navigation region includes a plurality of category thresholds each being associated with a category that includes a subset of interactive items, and wherein dynamically populating the display region includes determining that the pointer has reached a particular category threshold, designating the category threshold as an active threshold, and populating the display region with interactive items associated with the category corresponding to the active threshold.

10. The method as claimed in claim 9, wherein movement or change in position of the pointer in the navigation region causes the display region to cycle through the subsets of interactive items, and entering the selection interaction mode includes allowing the user to individually interact with the subset of interactive items corresponding to the active threshold.

11. The method as claimed in claim 1, wherein the interactive items include one or more of: information elements, objects, actions, applications and events.

12. The method as claimed in claim 1, wherein the pointer of a user is selected from: a cursor provided by the user interface, a pointing tool of the user, or a finger of the user.

13. The method as claimed in claim 1, wherein the electronic device is one of: a mobile phone, a handheld computer, a personal computer, a television and a gaming controller.

14. A method as claimed in claim 1, wherein the navigation path is a predefined path in the navigation region.

15. A method as claimed in claim 1, wherein the navigation path is defined by the movement of the pointer in the navigation region.

16. The method as claimed in claim 1, wherein the pointer of the user is a single pointer.

17. An electronic device comprising:
   a processor;

a non-transitory computer-readable medium having instructions encoded thereon that, when executed by the processor, cause the processor to:
provide a control region of a user interface, wherein the control region includes a navigation region within the control region, the control region and the control region comprising a three-dimensional region above a display region that extends perpendicularly from an x-y plane of a display of the electronic device along a z-axis determining a distance along the x-y plane of the display of the electronic device;
receive a predefined interaction from a pointer of a user;
display of a number of interactive items in the display region of the user interface on the display of the electronic device in response to receiving the predefined interaction, the display region comprising a two-dimensional region located in the x-y plane of the display of the electronic device;
track one or both of position and movement of the pointer within the control region above the display region on the display of the electronic device;
in response to the pointer moving in a first direction along a navigation path along the z-axis of the control region in the navigation region within the control region above the display region on the display of the electronic device without the pointer contacting the display of the electronic device, dynamically populate the display region by progressively adding interactive items or progressively removing interactive items from the number of interactive items displayed in the display region as the pointer moves in the first direction along the navigation path, wherein the number of interactive items populating the display region at a given time is based on the movement of the pointer in the first direction along the navigation path in the navigation region;
detect a substantial reversal of direction of the pointer's movement along the navigation path by the pointer moving in a second direction along the z-axis of the control region that is opposite to the first direction along each point in the navigation path within the control region independent of distance of the pointer from the display region; and
enter a selection interaction mode in which no further interactive items are added to or removed from the display region, where interactive items in the selection interaction mode each have a priority dynamically determined from their respective distances from the pointer and interactive items populating the display region are dynamically resized and repositioned relative to each other based on their priorities, in response to detecting the substantial reversal of the direction of the pointer's movement along the navigation path.

18. A computer program product for display and interaction in a user interface comprising a non-transitory computer-readable medium having stored computer-readable program code for performing the steps of:
providing a display region of the user interface on a display of an electronic device, the display region comprising a two-dimensional region located in an x-y plane of the display of the electronic device;
providing a control region of the user interface, wherein the control region includes a navigation region within the control region, the control region comprising a three-dimensional region above the display region that extends perpendicularly from the x-y plane of the display of the electronic device along a z-axis determining a distance above the x-y plane of the display of the electronic device;
in response to receiving a predefined interaction from a pointer of a user, initiating display of a number of interactive items in the display region;
tracking one or both of position and movement of the pointer within the control region above the display region on the display of the electronic device;
in response to the pointer moving in a first direction along a navigation path along the z-axis of the control region in the navigation region within the control region above the display region on the display of the electronic device without the pointer contacting the display of the electronic device, dynamically populating the display region by progressively adding interactive items or progressively removing interactive items from the number of interactive items displayed in the display region as the pointer moves in the first direction along the navigation path, wherein the number of interactive items populating the display region at a given time is based the movement of the pointer in the first direction along the navigation path; and
in response to detecting a substantial reversal of direction of the pointer's movement along the navigation path by the pointer moving in a second direction along the z-axis of the control region that is opposite to the first direction along each point in the navigation path within the control region independent of distance of the pointer from the display region, entering a selection interaction mode in which no further interactive items are added to or removed from the display region, where interactive items in the selection interaction mode each have a priority dynamically determined from their respective distances from the pointer and interactive items populating the display region are dynamically resized and repositioned relative to each other based on their priorities.

* * * * *

UNITED STATES PATENT AND TRADEMARK OFFICE
CERTIFICATE OF CORRECTION

PATENT NO. : 10,691,324 B2
APPLICATION NO. : 15/313098
DATED : June 23, 2020
INVENTOR(S) : Van Der Westhuizen et al.

It is certified that error appears in the above-identified patent and that said Letters Patent is hereby corrected as shown below:

In the Claims

Column 16, Claim 14, Line 59, delete "A" and insert --the--
Column 16, Claim 15, Line 61, delete "A" and insert --the--

Signed and Sealed this
Nineteenth Day of April, 2022

*Katherine Kelly Vidal*

Katherine Kelly Vidal
*Director of the United States Patent and Trademark Office*